July 6, 1965     C. E. BRANICK     3,192,570

DEVICE FOR SUPPORTING TIRE CASINGS IN RETREADING MOLDS

Filed Dec. 20, 1960     2 Sheets-Sheet 1

INVENTOR.
CHARLES E. BRANICK
BY
*Merchant & Merchant*
ATTORNEYS

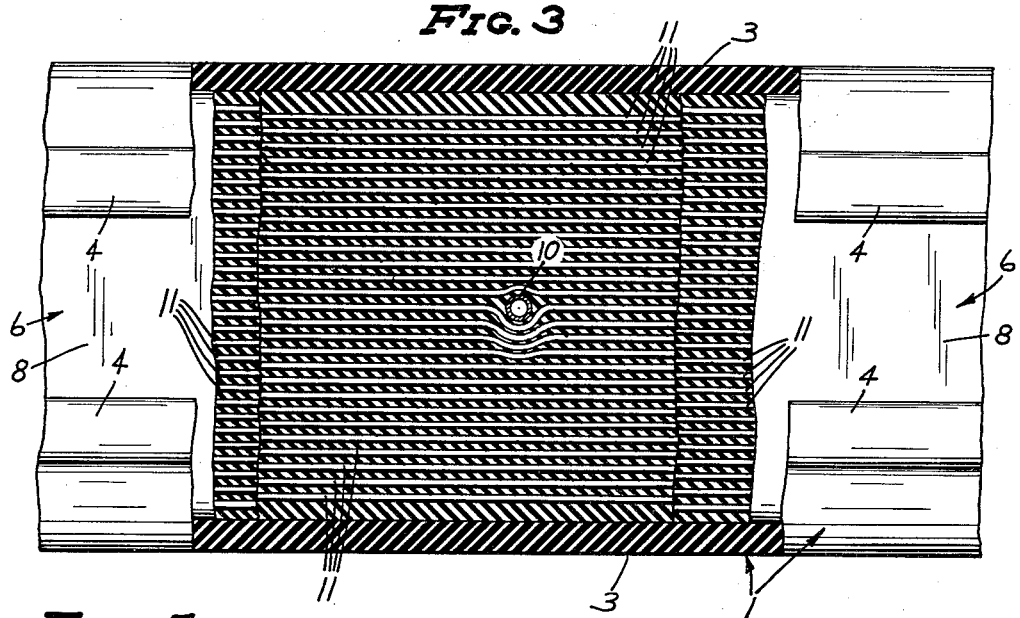
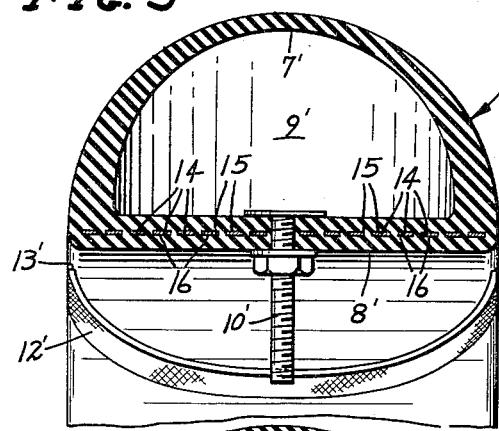
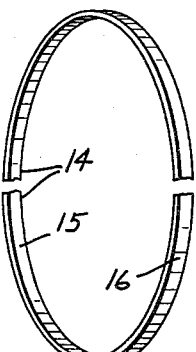
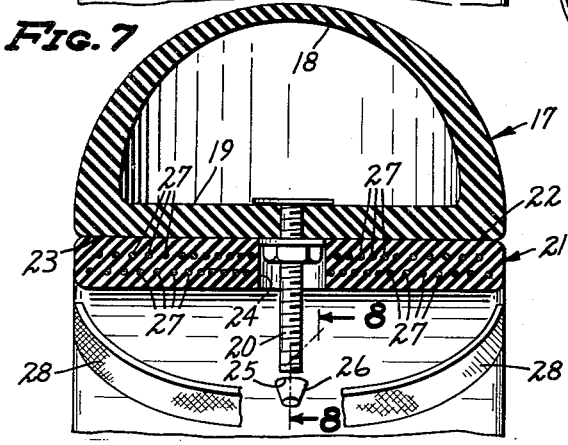
INVENTOR.
CHARLES E. BRANICK

United States Patent Office 3,192,570
Patented July 6, 1965

3,192,570
DEVICE FOR SUPPORTING TIRE CASINGS
IN RETREADING MOLDS
Charles E. Branick, % Branick Mfg. Co.,
P.O. Box 1937, Fargo, N. Dak.
Filed Dec. 20, 1960, Ser. No. 77,072
6 Claims. (Cl. 18—45)

My invention relates generally to curing apparatus for pneumatic rubber tire casings, and more particularly to a device for supporting a pneumatic tire casing against the tire engaging portion of a mold used in the retreading of the tire casing.

Heretofore, annular tubes or inflatable air bags have been utilized for supporting tires in retreading molds as above noted, the air bags having thick walls to prevent bulging inwardly when inflated, or being held in place by a rigid annular metal ring consisting of a plurality of connected ring sections pivotally or otherwise secured together and releasably locked in place within the tire casing. Such rings usually are produced in a plurality of widths to accommodate tires of various sizes, and not only represent a substantial monetary investment, but also require an appreciable amount of time and effort in placing the same within a tire and removal therefrom. Further, in using air bags and rings of this type, care must be exercised in using a ring of correct width, inasmuch as a ring of too great widths often results in injury to the inner wall surface of the tire casing; or, if the ring is too narrow, inward bulging of the air bag occurs at opposite side edges of the ring, resulting in undue wear on the walls of the air bag. Moreover, extreme care must be exercised in applying foldable sectionalized rings to prevent parts of the air bag from being pinched between the ring sections and materially weakened at these points.

An important object of my invention is the provision of a device for supporting a tire casing in a mold as set forth, which may be quickly and easily mounted in a tire casing and as quickly and easily removed after the tire curing operation.

Another object of my invention is the provision of a device of the above type which will not bulge inwardly when fluid, such as air under pressure is introduced thereinto to inflate the same, and which will not injure the inner wall surface of the tire.

Another object of my invention is the provision of an elastic air bag having a cross sectionally semi-circular radially outer wall and a generally cylindrical radially inner wall, and of novel reinforcing means which will hold the inner wall against inward bulging during inflation of the bag, but which will permit inward recurving of the inner wall portions, when the bag is deflated, to permit easy application of the bag to the tire and easy removal of the bag therefrom.

Still another object of my invention is the provision of a reinforcing element for air bags, comprising a generally cylindrical band of flexible non-metallic material having a plurality of rings of flexible resilient non-elastic rings embedded therein and concentric therewith, said rings being disposed in closely axially spaced side-by-side relation substantially throughout the axial dimension of said band.

Another object of my invention is the provision of a device as set forth having handle means projecting generally radially inwardly therefrom, whereby the annular band may be inwardly recurved for easy removal from the tire casing.

The above, and still further highly important objects and advantages of my invention will become apparent from the following detailed specification, appended claims and attached drawings.

Referring to the drawings, which illustrate the invention, and in which like reference characters indicate like parts throughout the several views:

FIG. 3 is an enlarged fragmentary view in plan as seen from the line 3—3 of FIG. 1, some parts being broken away and some parts being shown in section;

FIG. 4 is a view in perspective of one of the reinforcing rings of the device of FIGS. 1–3, some parts being broken away;

FIG. 5 is a view similar to FIG. 2, but showing a modified arrangement, some parts being removed;

FIG. 6 is a view corresponding to FIG. 4 but showing the modified form of reinforcing ring utilized in the modification of FIG. 5;

FIG. 7 is a view corresponding to FIG. 5, but showing a further modification; and FIG. 8 is an enlarged fragmentary section taken substantially on the line 8—8 of FIG. 7.

Figure 1:
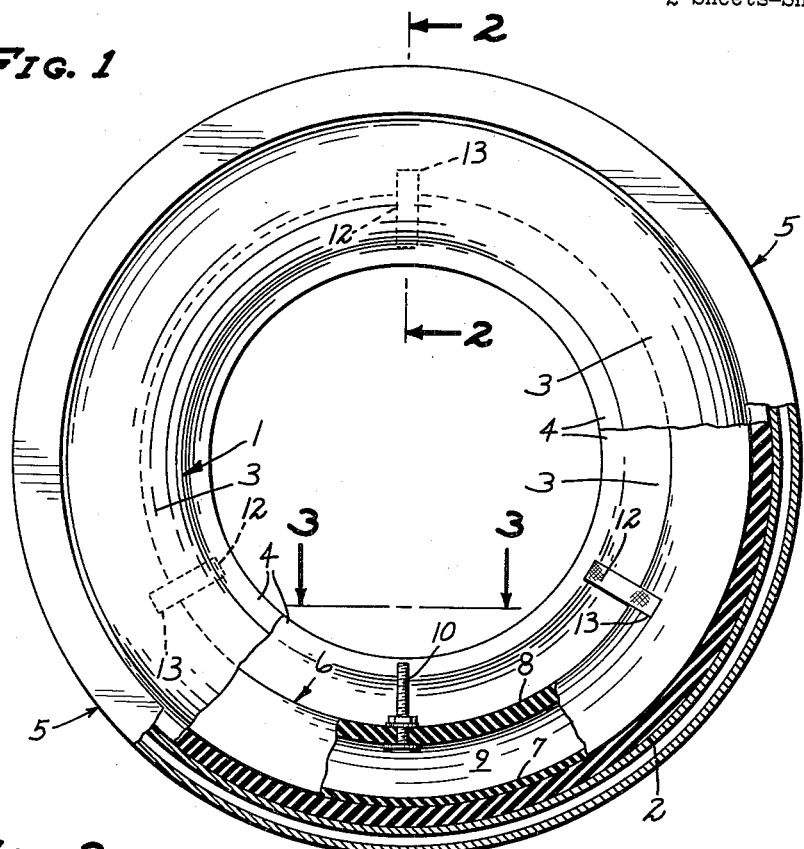
FIG. 1 is a view in side elevation of a tire mounted in a retreading mold, and showing my device positioned to support the tire within the mold, some parts being broken away and some parts being shown in section.

In the preferred embodiment of my invention illustrated in FIGS. 1–4, the numeral 1 indicates, in its entirety, a conventional pneumatic tire casing having a road-engaging crown portion 2, opposed side wall portions 3, and wheel rim-engaging bead portions 4. A conventional retreading or recapping mold 5 is shown as encompassing the tire 1 in the usual manner.

Figure 2:
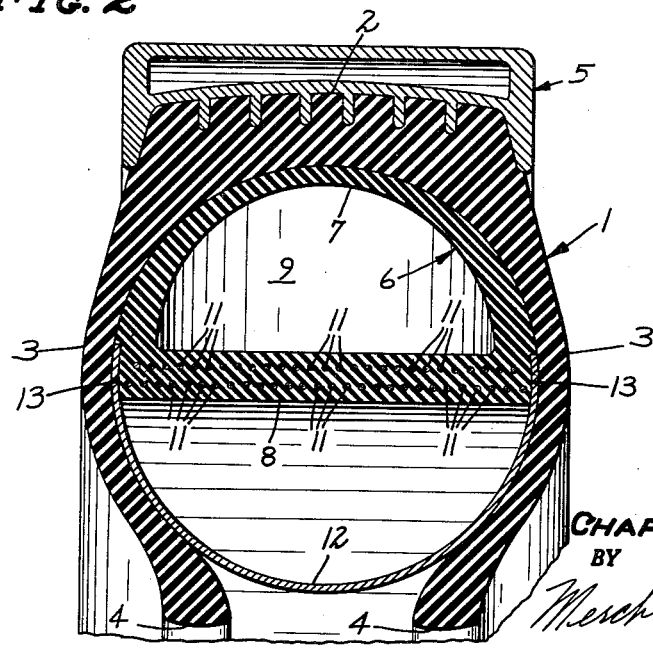
FIG. 2 is an enlarged fragmentary section taken substantially on the line 2—2 of FIG. 1.

In its preferred form, my improved tire supporting device comprises an endless annular air bag 6 preferably made from elastic material such as rubber or the like, and comprising a semi-circular radially outer wall 7 and a generally cylindrical axially flat radially inner band or wall 8 joined at its opposite side edges to the adjacent edges of the semi-circular wall 7, or preferably integrally formed therewith. The walls 7 and 8 cooperate to define an annular chamber 9 for reception of fluid, such as air, under pressure whereby to inflate the air bag 6 when the same is mounted in the tire 1 as shown in FIGS. 1–3. A conventional tire valve 10 is mounted in the radially inner wall 8 and extends radially inwardly therefrom, the valve 10 being adapted to be connected to a source of air under pressure, not shown. When air under pressure is introduced to the chamber 9, the air bag 6 inflates, whereby to press the radially outer wall 7 against the inner wall surface of the tire 1 underlying the road engaging crown portion 2 thereof, to hold the tire snugly within the mold 5.

Air bags or inflatable members of the type above broadly described have been heretofore used for the same purpose, these air bags requiring the use of supporting members for engagement with the radially inner surface of the inner wall 8 to prevent the inner wall from bulging inwardly, thus requiring more air within the chamber 9 to effect the desired pressure against the crown portion 2 of the tire 1 than otherwise required, the greater amount of flexing of the air bag under these conditions causing undue wear on the bag and shortening the life thereof. For the purpose of dispensing with the necessity for the usual inside curing rims, which are usually quite expensive, and which require an appreciable amount of time and effort to be properly placed within the tire, I provide novel reinforcing means within the radially inner cylindrical wall 8 for holding the wall 8 in a cylindrical shape when the air bag 6 is inflated. In the form of the invention illustrated in FIGS. 1–4, this novel means comprises inner and outer rows of flexible resilient but non-elastic rings 11 that are embeded in the radially inner wall or band 8 of the air bag 6, the rings 11 of each row thereof being concentric with the cylindrical wall 8 and arranged in axially spaced side-by-side relation across substantially the axial dimension of the inner wall 8, see FIGS. 2 and 3. The rings 11 are preferably made from metal, such as spring wire or the like, and, when air under pressure is introduced to the chamber 9 to inflate the air bag 6, the rings 11 effectively prevent any inward bulging of the inner wall 8 over its entire axial width. Inasmuch as air pressure within the chamber 9 against the cylindrical wall 8 is equal about the entire circumference thereof, inward bulging of any local portion of the inner cylindrical wall 8 about its circumference, is effectively prevented by the rings 11.

The flexibility and resilience of the rings 11, together with the elastic nature of the material of the air bag 6, permits any circumferential portion of the air bag 6 to be radially inwardly recurved when the air bag is deflated, whereby the air bag may be easily placed within the tire 1, or removed therefrom. For the purpose of enabling the operator to easily grasp a given portion of the air bag 6 and pull the portion radially inwardly whereby to recurve that portion to such an extent that the air bag 6 may be removed from the tire 1, I provide a plurality of flexible handle members or bails 12 disposed in circumferentially spaced relation and extending generally radially inwardly from the radially inner cylindrical wall 8, the opposite ends of the handle members 12 being suitably anchored to opposite side edge portions of the inner wall 8, as indicated at 13. The handle members 12 are preferably made from woven fabric or the like so that they do not interfere with the placing of the air bag 6 within the tire 1, or operation of the air bag 6. The metallic rings 11 and valve 10, being isolated from the inner wall surface of the tire 1, danger of injury to the inner wall surface by any portion of the air bag 6 during the curing of a tire, is eliminated.

With reference to FIG. 3, it will be noted that some of the rings 11 are laterally bent adjacent the valve 10 to provide space for the valve 10 to project through the radially inner cylindrical wall 8 of the air bag 6. By thus bending some of the rings 11, the same are, like all the rest, endless, thus providing for substantially equal strength throughout the width and circumference of the inner wall 8.

In the modified arrangement illustrated in FIGS. 5 and 6, the inner wall 8' of an air bag 6' has embedded therein a plurality of endless rings 14 in a single row thereof, the rings 14, like the rings 11 in each row thereof being concentric with the inner cylindrical wall 8' and disposed in closely spaced axially side-by-side relationship. Preferably, the rings 14 are made from flexible resilient metal, such as flat spring steel or the like, having axially flat radially inner and outer surfaces 15 and 16, see FIG. 6. With the exception of the endless rings 14, the air bag 6' is identical to the air bag 6, the several parts of the air bag 6' which are identical to corresponding parts of the air bag 6 carrying like reference characters with prime marks added.

In the modification illustrated in FIGS. 7 and 8, an endless annular air bag 17 is shown as comprising a semicircular radially outer wall 18 and an axially flat radially inner cylindrical wall 19, the walls 18 and 19 being similar to the walls 7 and 8 respectively of the air bag 6, the inner cylindrical wall 19 being devoid of reinforcing rings. A conventional tire valve 20 is mounted in and projects radially inwardly from the cylindrical wall 19. For use with this type of air bag, I provide an endless generally cylindrical reinforcing ring 21, preferably made from rubber or the like, the outer circumferential surface 22 of which is adapted to engage the inner circumferential surface 23 of the cylindrical wall 19 of the air bag 17. The ring 21 is preferably made from rubber or the like and is provided with a radial opening 24 for reception of the valve 20, and one or more radial openings 25 for reception of radially inwardly projecting locating bosses or the like 26 integrally formed with the inner wall 19 of the air bag 17 and projecting radially inwardly therefrom. Although but one of the openings 25 and locating bosses 26 are shown, it will be appreciated that several of each thereof may be employed to properly locate the ring 21 axially with respect to the air bag 17. Preferably and as shown, the reinforcing ring or band 21 is provided with a pair of rows of endless reinforcing rings 27 arranged in the same manner as the reinforcing rings 11 of the structure illustrated in FIGS. 1–3. Further, like the air bag 6, the reinforcing ring or band 21 is provided with a plurality of handle members or bails 28 similar to the handle members 12, one of the handle members 28 being shown in FIG. 7.

It will be appreciated that the band 21 may be grasped by any one of its handle members 28 to radially inwardly recurve the adjacent portion of the band 21 to enable the same to be inserted into or withdrawn from a tire casing in the same manner as the air bags 6 and 6', and that the air bag 17 may be similarly recurved to permit easy insertion into or withdrawal from a tire casing by grasping the inwardly projecting valve 20 and pulling the same radially inwardly. The handle members 28, being made of soft material such as woven fabric, the same may be applied to the air bag 19 in the same manner as the air bags 6 and 6', if desired, to inwardly recurve the air bag 17.

With the preferred and modified arrangements above described, I have eliminated the necessity for the commonly used metallic curing rings made from rigid hinged sections, which are expensive to produce and cumbersome to manipulate. Further, while I have shown and described a commercial embodiment of my novel tire supporting device and several modifications thereof, it will be understood that the same is capable of further modification without departure from the spirit and scope of the invention as defined in the claims.

What I claim is:

1. In a device for supporting a pneumatic tire casing against the tire engaging surface of a treading mold, an endless cross-sectionally semi-circular elastic curing bag wall defining one wall of a closed annular chamber and engageable with the inner wall surface of a tire casing under the tread portion of said casing, an endless generally cylindrical and radially inwardly recurvable reinforcing band operatively associated with said curing bag wall, means connecting said band for inwardly recurving a circumferential extent thereof for installing or removing same, and valve means extending generally radially through said band when said device is mounted in a tire casing for introduction of fluid under pressure to said chamber to press said curing bag wall against the engaged inner wall surface of the tire casing, said reinforcing band comprising an annulus of elastic material having axially substantially flat inner and outer surfaces and opposite ends engageable with the inner side wall surfaces of the tire casing, and a plurality of endless non-elastic flexible resilient rings embedded in said band and concentric therewith, said rings being disposed in closely axially spaced side-by-side relation substantially throughout the axial dimension of said band and in a plurality of concentric axially extended rows.

2. In a device for supporting a pneumatic tire casing against the tire engaging surface of a treading mold, an annular curing bag comprising an endless cross-sectionally semi-circular elastic radially outer wall and a generally cylindrical inner wall connected at its opposite edge portions to adjacent edge portions of said radially outer wall whereby to define an annular chamber, radially inwardly extended valve means mounted in said inner wall, and an endless generally cylindrical reinforcing element concentric with said inner bag wall and engaging the radially inner surface of said inner bag wall, said reinforcing element having an opening therethrough for reception of said valve means and comprising an endless band of flexible material and a plurality of endless non-elastic flexible resilient rings embedded in said band and concentric therewith, said rings being disposed in closely axially spaced side-by-side relation substantially throughout the axial dimension of said band.

3. The structure defined in claim 2 in further combination with handle means projecting radially inwardly from a portion of said band, whereby said portion may be recurved radially inwardly to facilitate removal thereof from the tire casing.

4. In a device for supporting a pneumatic tire casing against the tire-engaging surface of a treading mold, an annular curing bag having a cross-sectionally semicircular wall portion and an integral generally cylindrical wall portion cooperating to define a closed annular chamber, said semicircular wall portion being engageable with the inner wall surface of a tire casing under the tread portion of said casing, valve means extending generally radially through said generally cylindrical wall portion for introduction of fluid under pressure to said annular chamber, and a plurality of independent endless non-elastic flexible resilient rings imbedded in said cylindrical wall portion and concentric therewith, said rings being disposed in closely spaced side-by-side relation substantially throughout the axial dimension of said cylindrical wall portion.

5. The structure defined in claim 4 in which said rings are disposed in said cylindrical wall portion in a plurality of concentric axially separated rows.

6. The structure defined in claim 4 in further combination with flexible handle means projecting radially inwardly from circumferentially spaced inner portions of said bag, whereby said bag may be recurved from opposite sides thereof radially inwardly to facilitate removal thereof from the tire casing between the beads thereof.

References Cited by the Examiner
UNITED STATES PATENTS

| | | | |
|---|---|---|---|
| 1,681,146 | 8/28 | Pfeiffer | 18—45 |
| 1,779,385 | 10/30 | Wirgman et al. | 18—18 |
| 1,952,424 | 3/34 | Day | 18—45 |
| 2,679,662 | 6/54 | Pfeiffer | 18—45 XR |
| 2,869,180 | 1/59 | Fassero et al. | 18—45 |
| 2,873,479 | 2/59 | Di Pietro | 18—45 |

FOREIGN PATENTS

| | | |
|---|---|---|
| 541,297 | 5/57 | Canada. |
| 560,458 | 6/58 | Canada. |
| 597,575 | 5/60 | Canada. |

J. SPENCER OVERHOLSER, *Primary Examiner.*

MICHAEL V. BRINDISI, *Examiner.*